(No Model.) 2 Sheets—Sheet 1.

T. REBHOLZ.
WHEEL SCRAPER.

No. 400,791. Patented Apr. 2, 1889.

Witnesses.
Chas. R. Burr.
Thomas Durant

Inventor.
Timothy Rebholz
by Church & Church
his Attorneys.

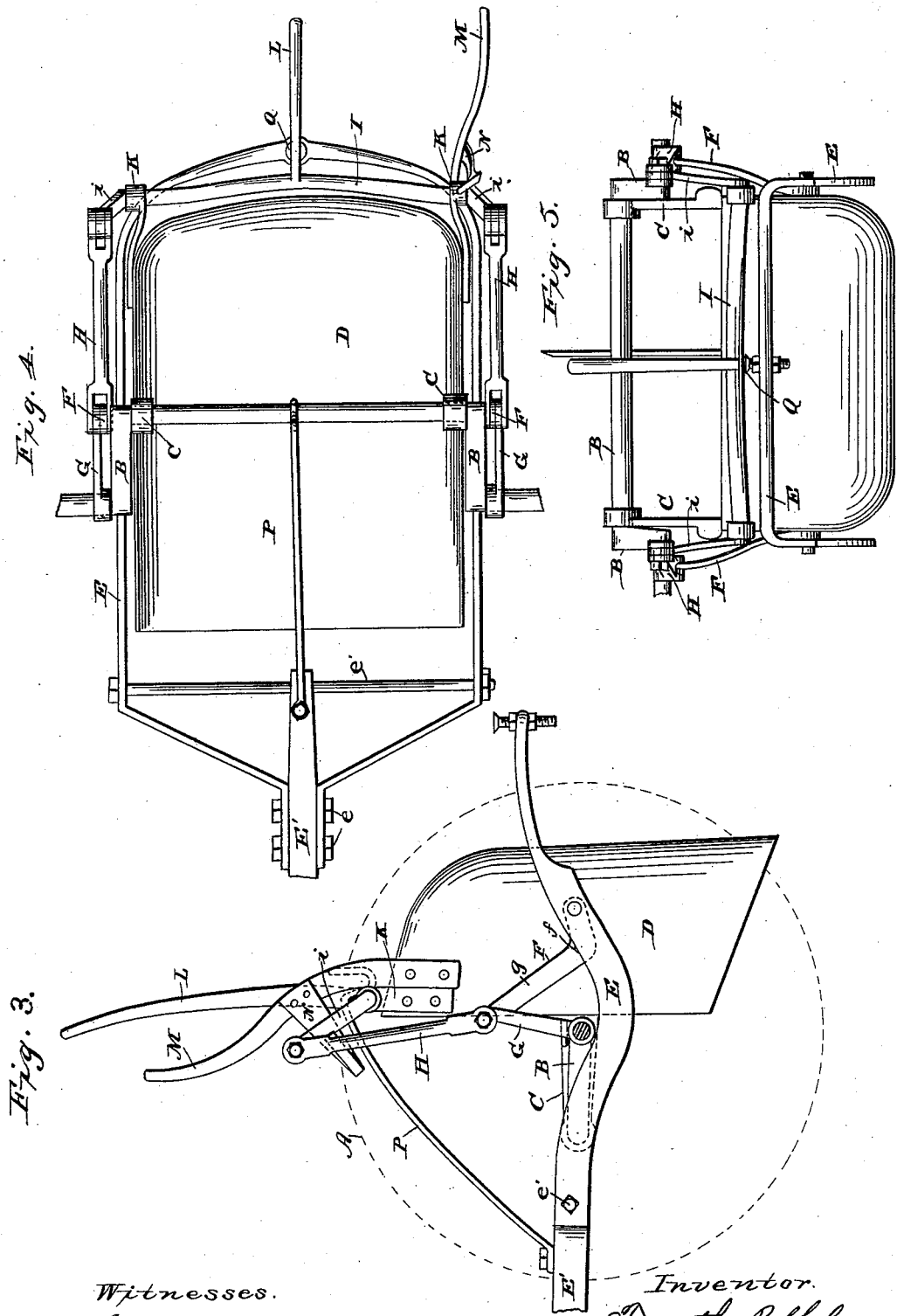

UNITED STATES PATENT OFFICE.

TIMOTHY REBHOLZ, OF TROY, OHIO, ASSIGNOR OF ONE-HALF TO WM. G. REBHOLZ, OF SAME PLACE.

WHEEL-SCRAPER.

SPECIFICATION forming part of Letters Patent No. 400,791, dated April 2, 1889.

Application filed May 28, 1888. Serial No. 275,368. (No model.)

*To all whom it may concern:*

Be it known that I, TIMOTHY REBHOLZ, of Troy, in the county of Miami and State of Ohio, have invented certain new and useful Improvements in Wheel-Scrapers; and I do hereby declare the following to be a full, clear, and exact description of the same, reference being had to the accompanying drawings, forming a part of this specification, and to the figures and letters of reference marked thereon.

The present invention relates to certain improvements in that class of scrapers in which the scraper-bowl is carried between two wheels in such manner as that it can be loaded or filled with dirt, then raised from the ground, transported to any desired place, and dumped, the object of the invention being to so improve the raising, lowering, and dumping mechanism as that the various movements may be perfectly controlled by the operator without any great labor on his part, and that without reaching over the scraper, as has heretofore been necessary, the raising of the load being done almost entirely by the draft of the team moving the same.

To these ends the invention consists in certain novel details of construction and combinations and arrangements of parts, as will be hereinafter described, and pointed out particularly in the claims at the end of this specification.

Figure 1:
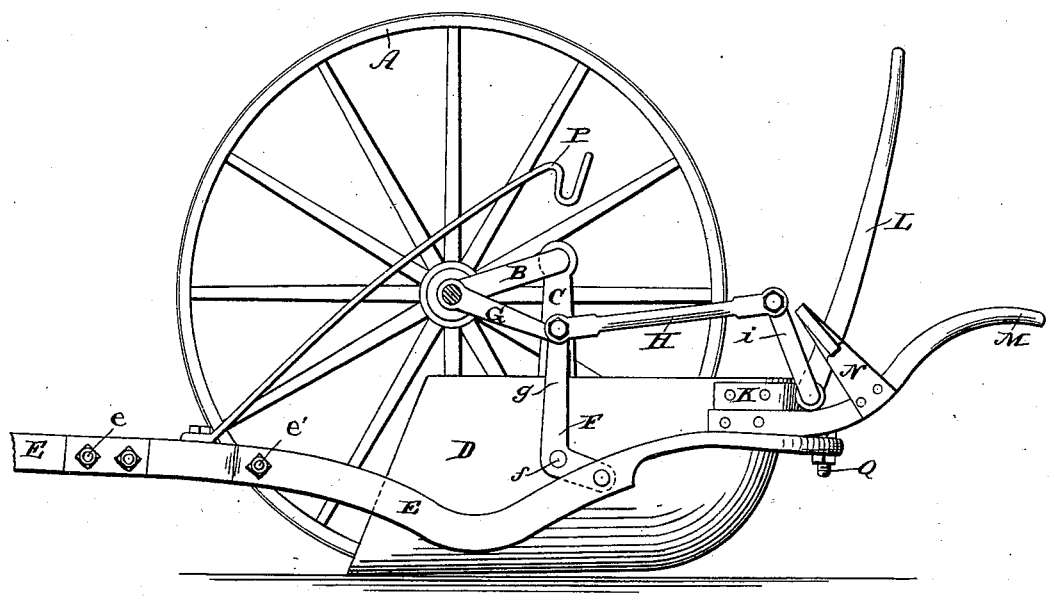
Figure 2:
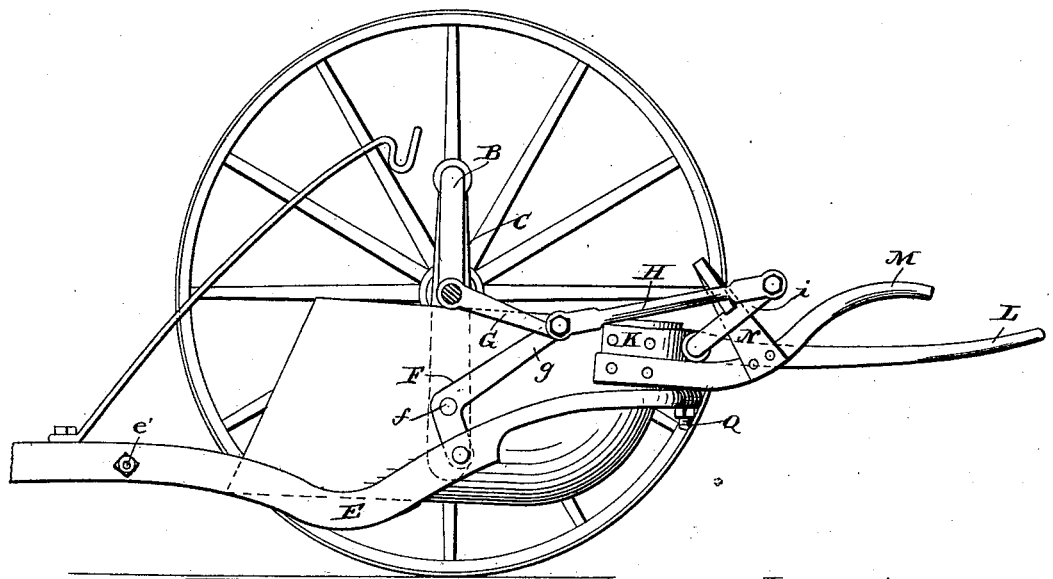

In the accompanying drawings, Figure 1 is a side elevation of a scraper in position for filling. Fig. 2 is a similar view with the scraper raised for transporting the load. Fig. 3 is a view after being dumped. Fig. 4 is a top plan view, and Fig. 5 a rear elevation.

Similar letters of reference in the several figures indicate the same parts.

The letter A designates the carrying-wheels, connected by the crank-axle B, in the center of which is hung, by links or standards C, the large scraper-bowl D, and extending entirely around the scraper-bowl is the frame or hounds E, rigidly connected to the tongue E', at the forward end, by means of the bolts $e$ and cross-rod $e'$. Bell-crank levers F, taking their bearings in the sides of the scraper-bowl in line with the standards C, which for the sake of cheapness and strength are preferably extended down and serve as supports for said bearings, as shown in dotted lines, Fig. 2, have studs $f$ formed on their shorter arms, which take bearings in the frame or hounds at each side and serve to support the said frame, while the longer arms, $g$, are extended in an upward direction, and are connected by links G to the crank ends of the axle B, upon which the carrying-wheels are journaled. Links or connecting-rods H extend back from the joints between the arms and links G to a lever pivoting on the rear of the scraper, adapted to operate both said rods H simultaneously. The lever above mentioned consists of a shaft, I, journaled in lugs or arms K, secured to the back of the scraper near the upper edge, and having the cranked ends $i$, to which the rods H are connected, an operating handle or lever, L, being rigidly connected to approximately the center thereof.

Secured to the scraper-bowl, preferably a little below one of the lugs K, is a handle, M, for dumping or controlling the movements of the scraper-bowl independently of the raising and lowering operations, said handle also serving as a support for a spring catch or lock, N, which, engaging one of the crank ends $i$ of the raising and lowering lever, serves to hold the scraper-bowl elevated when loaded and ready for transportation. The hounds or frame is preferably curved as shown—that is to say, down in front of the point of connection with the bell-crank lever, for a purpose to be presently explained, and up at the rear portion to serve as a stop for limiting the downward movement of the scraper-bowl at the rear—although it is obvious that stops might be placed on the front of the scraper-bowl, as in Patent No. 317,280, issued May 5, 1885.

The operation will now be apparent. Assuming that the scraper-bowl is down in position for loading, as in Fig. 1, in which position it will be observed that the front edge inclines downward to facilitate its entrance into the dirt, the scraper is drawn forward, the strain being taken from the frame or hounds by the shorter arms of the bell-crank levers in a direction which has only a slight, if any, tendency to move them in either direction, and the crank ends of the axle being almost directly in front of the pivoted points the resistance of the wheels will also be prevented from moving the scraper-bowl, as will be readily understood. The load having been forced up into the scraper-bowl, the handle L is grasped and drawn back, the result being that the ends of the axle and shorter arms of the bell-crank levers are turned down below the centers, and upon the forward movement of the team both combine to assist in raising the load to its full height, when it is locked and held by the catch N to be transported to its destination. To dump, it is only necessary to lift the scraper-bowl by means of the handle M clear over until the crank ends of the axle rest on the frame or hounds in the downwardly-curved portion before mentioned, when the scraper will occupy the position shown in Fig. 3, being held in such position, which is a convenient one for transporting the apparatus from place to place, by means of the long spring-catch P, secured to the tongue or front of the frame, and which engages the shaft I on the back of the scraper. A balance pin or stop, Q, is secured to the frame at the rear of the scraper-bowl, adapted to engage the lever or shaft I and adjust the angle at which the scraper-bowl shall operate, as will be readily understood.

In the preferred form of scraper the bowl is so constructed as that when in raised position and ready for dumping the front edge will project beyond the peripheries of the wheels, and when tilted to dump will be retarded by the dirt and thrown over the remaining distance without effort on the part of the operator. The long arms of the bell-crank levers and the links G form toggle-joints, which give a powerful leverage over the load during the first part of the raising operation. By the peculiar arrangement of bell-crank levers and axle the front edge of the scraper-bowl is caused to be depressed more than the back portion when the same is lowered; but upon raising the bowl again it will be brought back to level position, as will be readily understood.

While I have described the various parts of my scraper and their various locations particularly, I do not wish to be limited to the exact mechanism shown and described, as it is perfectly obvious that many changes and modifications may be made without departing from the spirit of my invention—as, for instance, the frame or hounds might be connected directly to the bowl and bell-crank levers omitted or changed as to size or position, and other means than those described may be employed to hold the scraper elevated or to stop its tilting in either direction.

Having thus described my invention, what I claim as new is—

1. In a wheel-scraper, the combination, with the cranked axle, the scraper-bowl hung thereon, and the frame or hounds connected to the scraper-bowl, of a rod or shaft journaled on the rear of the scraper-bowl, and having the cranked ends connected to the cranked ends of the axle, and the handle for rotating said shaft, whereby the scraper-bowl may be raised or lowered, substantially as described.

2. In a wheel-scraper, the combination, with the cranked axle, the scraper-bowl hung thereon, and the frame or hounds connected to the scraper-bowl, of a rod or shaft journaled on the rear of the scraper-bowl, having its cranked ends connected to the cranked ends of the axle, and the catch engaging the cranked ends of the shaft for holding the bowl in elevated position, substantially as described.

3. In a wheel-scraper, the combination, with the cranked axle, the scraper-bowl hung thereon, the frame or hounds, and the bell-crank levers connecting said scraper-bowl and frame, of a lever connected to the cranked axle and bell-crank levers, respectively, for moving the same and raising or lowering the scraper-bowl, substantially as described.

4. In a wheel-scraper, the combination, with the cranked axle, the scraper-bowl hung thereon, the frame or hounds, and the bell-crank levers connecting said frame and scraper-bowl, of a lever pivoting on the rear of the scraper-bowl, and a connection between the cranked end of the axle and bell-crank levers, and levers pivoted to the rear of the bowl, as set forth.

5. In a wheel-scraper, the combination, with the cranked axle, the scraper-bowl hung thereon, and the lever for raising and lowering said scraper-bowl, of the frame or hounds extending entirely around the bowl, and serving as a stop for limiting the tilting of the same, substantially as described.

6. In a wheel-scraper, the combination, with the cranked axle, the scraper-bowl hung thereon by the standards having the downward extensions, and the frame or hounds, of levers carried by the lower ends of the standards and connected to the frame or hounds, and a lever connected to said first-mentioned levers and to the cranked axle for raising and lowering the scraper-bowl, substantially as described.

7. In a wheel-scraper, the combination, with the cranked axle, the scraper-bowl hung thereon, the frame or hounds, the bell-crank levers connecting the bowl and frame or hounds, the lever pivoted to the rear of the scraper-bowl, and the connection between said lever and the cranked end of the axle and bell-crank levers, of a handle, also connected to the rear of the scraper-bowl, and serving to tilt or dump the same independently of the raising and lowering mechanism.

8. In a wheel-scraper, the combination, with the cranked axle, the scraper-bowl hung thereon, the frame or hounds passing around the same, and the bell-crank levers uniting the frame and scraper-bowl, of the lever pivoting on the rear of the scraper-bowl, and connected to the cranked end of the axle and bell-crank levers for raising and lowering, the dumping-handle rigidly connected to said scraper-bowl, and the lock for holding the same in elevated position while being dumped, substantially as described.

9. In a wheel-scraper, the combination, with the cranked axle, the scraper-bowl hung thereon, the frame or hounds passing around the same, and the raising and lowering lever, of an adjusting-block on said frame or hounds for varying the angle at which the scraper-bowl shall operate, substantially as described.

TIMOTHY REBHOLZ.

Witnesses:
JOHN E. HENNE,
JUSTUN DIEHL.